April 7, 1931.　　　　H. J. NEUFANG　　　　1,799,862
DRAFT APPLIANCE FOR TRACTORS AND THE LIKE
Filed May 12, 1928　　　2 Sheets-Sheet 2
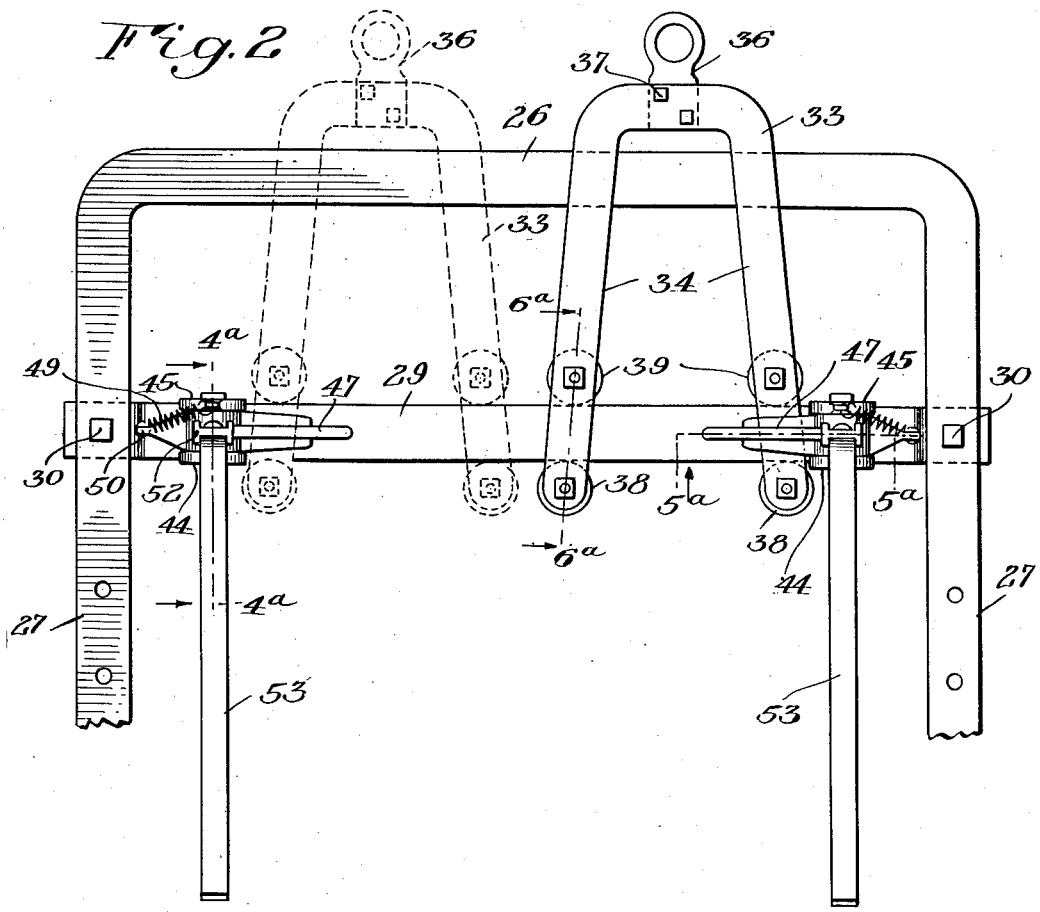
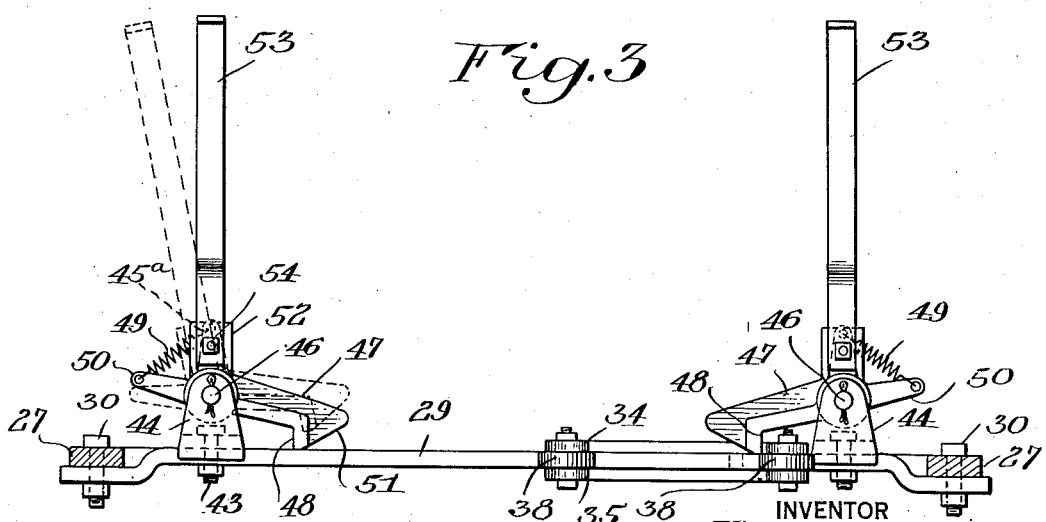
INVENTOR
Henry J. Neufang
BY
Cumpston + Griffith
his ATTORNEYS Patented Apr. 7, 1931

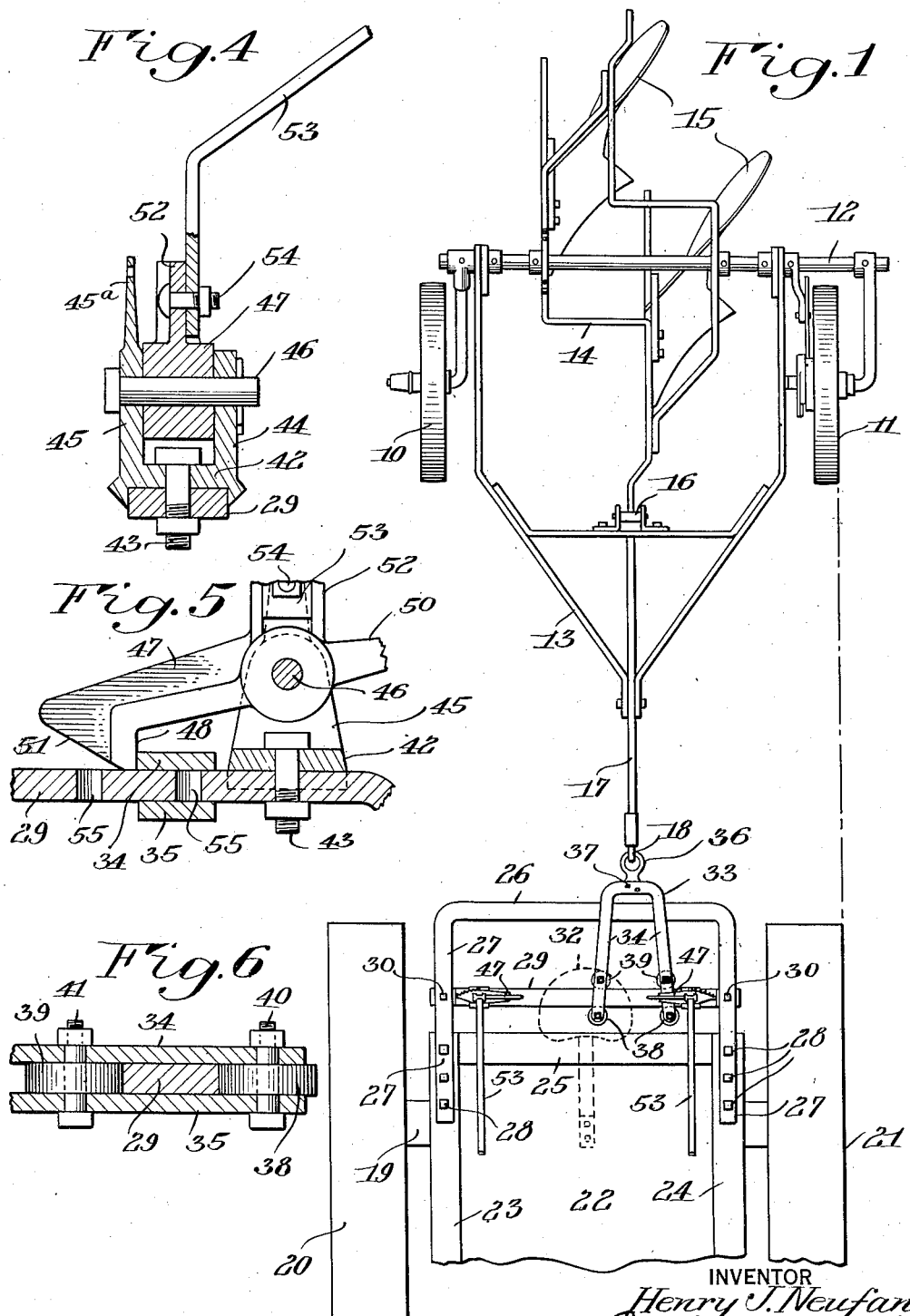

1,799,862

UNITED STATES PATENT OFFICE

HENRY J. NEUFANG, OF ATLANTA, NEW YORK, ASSIGNOR, BY DIRECT AND MESNE ASSIGNMENTS, TO BOGGS PLOW COMPANY, INC., OF ATLANTA, NEW YORK, A CORPORATION OF NEW YORK

DRAFT APPLIANCE FOR TRACTORS AND THE LIKE

Application filed May 12, 1928. Serial No. 277,364.

The present invention relates to draft appliances for tractors and has for its object to provide an improved device of this class which can be attached to or made to constitute a part of the tractor and by which the tractor may be readily connected with different types of agricultural machines or farming implements, such for example as plows and the like.

A further object of the invention is to provide an improved hitching mechanism or draft appliance for use between agricultural machines or implements and a tractor or other power driven machine for drawing the implements, in which a draft connection has its front end connected with a transverse portion of the tractor for travel thereon between two or more operating positions whereby to shift the line of draft as required under certain conditions of operation, the shift being effected through relative movement between the implement and tractor when turning the latter.

A further object of the invention is to provide an improved tractor hitch of the class described comprising a draft connection mounted for lateral adjustment upon the tractor and which can be released from the seat of the driver for travel back and forth between different service positions, in which it is held by automatic locking devices in its path of travel.

A further object of the invention is to provide an improved tractor hitch comprising a draft connection capable of lateral travel upon the tractor without substantial variation in its angular relationship with respect to the longitudinal center line thereof and which will freely shift to different service positions for moving it to and from said positions under the load thereon without the use of operating means.

To these and other ends the invention resides in certain improvements and combinations of parts, all as will be hereinafter more fully described, the novel features being pointed out in the claims at the end of the specification.

In the drawings:

Fig. 1 is a plan view illustrating one embodiment of the invention and showing the manner of employing the same for attaching a plow to a tractor;

Fig. 2 is an enlarged fragmentary plan of the hitch and that portion of the tractor with which it is connected;

Fig. 3 is a view in elevation of the same;

Fig. 4 is a sectional elevation through one of the locking devices by which the laterally movable draft connection is held in service position, the section being taken on line 4a—4a of Fig. 2;

Fig. 5 is a fragmentary sectional elevation taken substantially on line 5a—5a of Fig. 2; and Fig. 6 is a sectional elevation of one of the arms of the laterally shiftable draft connection, taken on line 6a—6a of Fig. 2.

Similar reference numerals throughout the several views indicate the same parts.

While the present invention relates broadly to a hitching mechanism for tractor drawn machinery, it is particularly adapted for use in connection with ground working implements, such for example as plows of different types, one of which is shown in Fig. 1 as a reversible right and left hand wheel supported plow.

Referring to the drawings, 10 and 11 represent the wheels of the plow which are connected by a crank axle 12 carrying a main frame indicated generally at 13 and a rotary frame 14 mounted to swing through a circle upon the axle and having two sets of plows, only one being shown as indicated at 15. A locking or holding device for the rotary frame is indicated generally at 16 and engages the opposite ends of the rotary frame to support it in operating position. A draft beam or bar 17 is extended forwardly from the main frame 13 and carries a member 18 of any suitable construction for pivotally connecting the beam 17 t .ne rear end of a draft yoke or connection hereinafter described.

The tractor may be of any well known type having a rear axle 19 and wheels 20 and 21 shown conventionally in Fig. 1. The body or chassis of the tractor is indicated generally at 22 and the same may include side frame members 23 and 24 having a transverse connecting member 25.

To any suitable or convenient part of the tractor, such for example as the side frame portions 23 and 24, is secured a U-shaped frame member comprising a transverse bar 26 having angularly disposed side portions 27 which are extended longitudinally of and suitably connected with the frame members 23 and 24 as by means of the bolts 28 shown in Fig. 1.

A transverse draft bar 29 extends between and has its opposite ends connected with the side portions 27 of the U-shaped frame preferably by a suitable number of bolts 30, as shown in Figs. 2 and 3. The ends of the bar 29 are preferably offset downwardly as indicated in Fig. 3 to permit the main portion of the bar to lie in the plane of the transverse bar 26 for a purpose which will appear hereinafter.

The driver's seat is shown by dotted lines at 32 in Fig. 1 and the same is preferably disposed centrally of the tractor between the rear wheels thereof in the usual manner.

The draft connection between the transverse bar 29 and the front end portion 18 of the draft beam 17 is indicated generally at 33 in Fig. 1. It is preferably yoke shaped though may be otherwise constructed and at the same time maintain its present characteristics which are essential to its operation in the manner intended. It is designed for free travel upon the transverse draft bar 29 when released and is movable to and from the different operating positions shown by full and dotted lines in Fig. 2 and requires no shifting mechanism since its travel back and forth is effected by the relative movement between the plow and the tractor when turning the latter to the right or left as the case may be, as is required for example upon reaching the end of the furrow. One reason for the lateral shifting movement of the draft connection is to insure movement of the wheel 11 of the plow in the furrow in which the tractor wheel 21 is moving and likewise the wheel 10 in the furrow in which the tractor wheel 20 moves when the tractor is reversed to move in an opposite direction. This is necessary when operating a reversible right and left hand plow of the type shown and described.

The draft connection 33 is so designed and mounted as not to change its angular relationship with respect to the longitudinal center line of the tractor when shifting from one service position to another. The draft connection preferably comprises a pair of upper and lower substantially U-shaped members 34 and 35 respectively between which extend the transverse bars 26 and 29, the former serving as a guide bar for the rear end of the draft connection and the latter as a transverse draft bar on which the connection is arranged to travel between the positions shown by full and dotted lines in Fig. 2. Inserted between the rear ends of the upper and lower U-shaped draft members is a member 36 of any preferred construction suitable for cooperation with the member 18 on the draft beam 17 to pivotally connect the latter with the draft connection 33. The member 36 is firmly secured between the rear ends of the U-shaped draft members preferably by the bolts 37 shown in Fig. 2. The upper and lower U-shaped draft members have disposed therebetween two sets of rollers 38 and 39, the former being arranged for travel on the front edge of the transverse bar 29 and the latter on the rear edge thereof. Pivot bolts 40 and 41 serve both as members on which the rollers are adapted to rotate and as means to connect the front ends or arm portions of the U-shaped draft members 34 and 35.

Devices for locking or holding the draft connection in its operating or service positions are provided at the opposite ends of the transverse bar 36, as best shown in Figs. 2 and 3. As these devices are similar in construction, a description of one will suffice for the other. As shown in Figs. 4 and 5, a bracket 42 is secured to the bar 29 by a bolt 43. The bracket is provided at its sides with spaced upstanding portions 44 and 45 through which is projected a bolt 46 upon which is pivotally mounted between said portions a locking lever 47 having a shoulder 48 for engaging the inner edge portion of one of the arms of the upper U-shaped draft connection 34, as best shown in Fig. 5. The inner end of the lever normally rests on the bar 29, where it is yieldingly held by a spring 49 having one end connected with an arm 50 on the lever and the other with an upwardly extended portion 45a on the bracket portion 45 shown in Fig. 4. The inner ends of the levers are provided with bevelled or inclined portions 51 which are engaged by the arms of the upper U-shaped draft connection when the latter is moved to its different operating or service positions. The levers are automatically raised by the arms of the draft connection which pass beneath the shouldered portions 48 to the position shown in Fig. 5, after which the springs 49 serve to pull up the lever arms 50 thereby lowering the shouldered portions 48 of the levers into locking position with respect to the arms of the draft connection. The central hub or bearing portion of the lever carries an upwardly extending grooved lug 52 in which is disposed the lower end of an operating arm or member 53 for moving the locking lever to release position. A bolt 54 serves to secure the lower end of the arm 53 within the groove of the lug 52 as indicated in Fig. 4. The operating members 53 are preferably extended upwardly and bent forwardly to extend on opposite sides of the driver's seat 32, where they will be in position to permit the driver of the tractor to readily shift the same, either by the use of the hands or feet, whereby to move said operating members to release position, as indicated by the dotted line position shown at the left of Fig. 3. Moving of the operating member to this position serves to raise the inner end of the lever 47 whereby to release the draft connection for travel upon the transverse draft bar 29 in either direction as stated above.

In order to regulate or vary the extent of the lateral shifting movement of the draft connection on the transverse bar 29, the latter is provided with a plurality of holes 55, Fig. 5, adapted to receive the bolts 43 of the brackets 42 whereby the latter may be adjusted inwardly or outwardly within certain limits, which adjustment may be readily made for the purpose stated.

In the operation of the present mechanism, as for example when the tractor is connected with a reversible right and left hand plow of the type shown, it is customary to operate first one wheel of the plow in the furrow and then the other when moving back and forth, as required in right and left hand plowing. It is also customary to operate one rear wheel of the tractor within the furrow while the other operates upon unplowed ground. In certain types of tractors the distance between the centers of the treads of the wheels is considerably greater than that between the centers of the wheels of the plow, as is the case in the present instance. It is necessary, therefore, to provide means which while suitably connecting the plow with the tractor will, when the tractor and plow are turned at the end of each furrow, permit lateral shifting of the plow with respect to the tractor in order that either wheel of the plow may follow in the furrow of the wheel of the tractor operating therein. For example, as shown in Fig. 1, the wheel 11 of the plow is alined with the wheel 21 of the tractor so that both will operate within the furrow. If, however, the plow and tractor are turned and moved in the opposite direction from that shown, the wheel 20 of the tractor will travel in the furrow and the wheel 10 of the plow will be made to follow therein. This results from turning the tractor at the end of the furrow and at the same time releasing the particular locking device which happens to be holding the draft connection in service position. The release is, of course, effected by the driver in swinging one or the other of the arms 53 outwardly to raise the lever 47 from engagement with the draft connection, whereby in turning the tractor to the right or left as the case may be the relative movement between the draft connection and the transverse draft bar 29 causes the connection to travel upon the bar from one operating position to another and the draft connection becomes automatically locked by the levers when reaching the positions shown by full and dotted lines in Fig. 2.

It will be noted that each set of rollers carried by the draft connection is free to travel on the transverse draft bar, and that the rollers of both sets are spaced a considerable distance apart so that the load is better distributed on the transverse bar than if only one point of connection were provided between the draft connection and the tractor. Furthermore, the provision of the two sets of spaced rollers on opposite sides of the transverse bar 29 prevents any change in the angular relationship of the draft connection with respect to the longitudinal center line of the tractor. This arrangement assures a perfect alinement of the draft beam 17 with the center of the draft connection in all operating positions, whereby the pull is always in a straight line which is not true in cases where the draft connection is pivotally connected at its front end with the tractor and swung from one operating position to another.

The transverse bar 26 prevents either upward or downward movement of the draft connection and the latter is free to travel upon the bar within the limits afforded by the locking devices adjacent the ends of the bar 29.

I claim as my invention:

1. The combination with an implement and a tractor or the like for drawing the implement, of a hitching mechanism connecting the implement to the tractor comprising a transverse draft bar on the tractor, a draft connection between the implement and said bar movable bodily upon the bar, independent locking devices for the connection disposed adjacent the opposite ends of the bar between which the connection is adapted to travel, said locking devices being actuated by different portions of the connection to automatically lock the latter when moved to its different operating positions, and means for moving said locking devices to effect release of the connection, said connection when released being shifted from one operating position to another through relative movement between the implement and tractor when turning the latter to the right or left of the implement.

2. The combination with an implement and a tractor for drawing the implement, of a hitching mechanism connecting the implement to the tractor comprising a transverse bar on the tractor, a draft connection between the implement and said bar movable bodily upon the latter and having at its forward end a pair of rollers arranged to travel on the bar and separate automatic spring pressed locking devices adjacent the opposite ends of the bar each adapted to be actuated in one direction by the connection whereby said connection will be automatically locked by said devices when moved to its extreme positions, the shifting of said connection being effected by relative movement between the implement and the tractor when turning the latter to the right or left of said implement.

3. The combination with an implement and a tractor for drawing the implement, of a hitching mechanism connecting the implement to the tractor comprising a transverse bar on the tractor, a draft connection between the implement and said bar having at its forward end a pair of rollers arranged to travel on the bar, a guide bar for said connection spaced rearwardly from said transverse bar and serving to hold the connection against vertical movement and separate automatic locking devices adjacent the opposite ends of the transverse bar between which the connection is adapted to travel, each locking device being actuated by a different portion of the connection whereby to lock said connection when it is moved to its extreme positions.

4. The combination with an implement and a tractor for drawing the implement, of a hitching mechanism connecting the implement to the tractor comprising a transverse bar supported by the tractor adjacent the rear end thereof, a draft connection between the implement and said bar movable to different operating positions upon the latter on opposite sides of the longitudinal center line of the tractor and comprising spaced draft arms each provided with a roller arranged to travel upon the bar and separate locking devices for said arms adjacent the opposite ends of the bar, said devices being adapted to engage and automatically lock the arms when moved into engagement therewith and being arranged for release by the driver of the tractor and said draft connection when released being shifted automatically from either side of said center line to the other by a turning movement of the tractor in one direction or another.

5. The combination in a draft appliance for tractors and the like, of a bar adapted to be secured to the rear of the tractor to extend transversely thereof, separate automatic locking devices secured adjacent the opposite ends of the bar, and a bodily movable draft connection having a bearing portion arranged for travel upon the bar to transmit thereto the load of the implement and having spaced portions for actuating the locking devices to condition them for movement to locking engagement with the connection when it is moved back and forth to its different service positions in which it is held by said locking devices.

6. The combination in a draft appliance for connecting implements with tractors and the like, of a bar for attachment to the rear end of the tractor to extend transversely thereof, automatic locking devices adjacent the opposite ends of the bar, a draft connection movably bodily upon and extending rearwardly from the bar and having spaced rollers arranged to travel thereon to transmit to the bar the load of the implement and permitting the connection to be moved back and forth to positions at which it will displace the locking devices for movement into locking engagement therewith, and means in rear of said bar for supporting and guiding the rear end of the connection.

7. The combination in a draft appliance for tractors and the like, of a bar for attachment to the rear end of the tractor to extend transversely thereof, automatic locking devices adjacent the opposite ends of the bar, a draft connection extending rearwardly from the bar and having spaced rollers arranged to travel thereon whereby the connection may be moved back and forth to positions at which it will cause the locking devices to engage and hold it in service position, a second transverse bar in rear of the first for supporting and guiding the rear end of the connection, and operating members for releasing the locking devices extending therefrom in position to be actuated from the seat of the driver of the tractor.

8. The combination in a draft appliance for tractors and the like, of a bar for attachment to the rear of the tractor to extend transversely thereof, automatic locking devices adjacent the opposite ends of the bar, a draft connection comprising upper and lower sections of substantially U-shaped construction extending above and below said bar and having spaced rollers arranged to travel thereon whereby the connection may be moved back and forth to positions at which it will cause the locking devices to automatically move into locking engagement therewith, and a second bar in rear of said first mentioned bar extending between the upper and lower sections of the connection and serving to support and guide the rear end of the connection.

9. The combination in a draft appliance for tractors and the like, of a bar for attachment to the rear of the tractor to extend transversely thereof, locking devices adjacent the opposite ends of the bar, each including a spring pressed locking lever, a draft connection extending rearwardly from the bar and having spaced rollers arranged to travel whereby the connection may be moved back and forth to positions at which it will cause said levers to move into locking engagement therewith and a second transverse bar in rear of the first mentioned bar for supporting and guiding the rear end of the connection.

10. The combination in a draft appliance for tractors and the like, of a bar for attachment to the rear of the tractor to extend transversely thereof, locking devices at the opposite ends of the bar, each including a bracket having a lever pivoted thereon extending longitudinally of the bar and having a bevelled portion at its inner end and a spring for holding said end in engagement with said bar, a draft connection extending rearwardly from the bar and having spaced rollers arranged to travel thereon whereby the connection may be moved back and forth to positions at which it will engage and ride under said bevelled ends to raise said levers for movement by said springs into locking position upon the connection and a second transverse bar in rear of the first for supporting and guiding the rear end of the connection.

11. The combination in a draft appliance for tractors and the like, of a bar for attachment to the tractor adapted to extend transversely thereof, a draft connection disposed horizontally upon the bar and extending rearwardly therefrom and having a front portion arranged to travel upon the bar, a spring actuated locking device adjacent each end of the bar each arranged to be actuated by a different portion of said draft connection to a position from which it will be moved by its spring into locking engagement with the connection and a guide bar for the rear end of the connection serving to support and guide it in a substantially horizontal plane when moved between said locking devices.

12. The combination in a draft appliance for tractors and the like, of a bar for attachment to the tractor to extend transversely thereof, a draft connection arranged for lateral travel upon the bar and a locking device for the connection comprising an upstanding bracket connected with the bar, a locking lever pivoted upon the bracket and having its locking end disposed inwardly thereof and a spring interposed between the opposite end of the lever and the bracket, said locking end being constructed to permit the draft connection to pass under and raise the lever whereby it will be moved by the spring into locking engagement with the draft connection when the latter is moved to service position.

13. In a draft appliance of the class described, a draft bar, a draft connection arranged to travel back and forth upon the bar and adapted to exert a pull thereon when a load is applied to the connection, separate automatic locking devices for the connection each secured adjacent one end of the bar arranged to be actuated in one direction by the travel of the connection and including means for moving it in the opposite direction to locking position when the connection is moved to a predetermined position, and a manually operable part associated with each locking device for moving it to release position.

HENRY J. NEUFANG.